United States Patent [19]
Bernuchon et al.

[11] Patent Number: 5,965,037
[45] Date of Patent: Oct. 12, 1999

[54] INERT GAS ELECTRIC ARC WELDING PROCESS AND TORCH FOR USE THEREIN

[75] Inventors: Roland Louis Georges Bernuchon, Fontenay Sous Bois; Etienne Ledauphin, Villabe, both of France

[73] Assignee: Societe Nationale D'Etude et de Construction de Moteurs d'Aviation "Snecma", Paris, France

[21] Appl. No.: 08/968,451

[22] Filed: Nov. 12, 1997

[30] Foreign Application Priority Data

Dec. 19, 1996 [FR] France ................................. 96 15630

[51] Int. Cl.⁶ .................................................. B23K 9/167
[52] U.S. Cl. ........................................ 219/75; 219/125.12
[58] Field of Search ........................... 219/75, 121.11, 219/125.12, 136, 145.21, 74

[56] References Cited

U.S. PATENT DOCUMENTS

| | | | |
|---|---|---|---|
| 1,244,705 | 10/1917 | Coffin | 219/121.11 |
| 3,005,902 | 10/1961 | Copleston et al. | 219/74 |
| 4,270,037 | 5/1981 | Grinin et al. | 219/75 |
| 4,455,471 | 6/1984 | Ecer et al. | 219/125.12 |

FOREIGN PATENT DOCUMENTS

| | | |
|---|---|---|
| 0 677 353 A2 | 10/1995 | European Pat. Off. . |
| 6-15455 | 1/1994 | Japan ................. 219/75 |
| 1708557 | 1/1992 | U.S.S.R. ............. 219/75 |

OTHER PUBLICATIONS

Y. Sugitani, et al., "Automatic Simultaneous Control Of Bead Height And Back Bead Shape Using An Arc Sensor In One–Sided Welding With A Backing Plate," Welding International, vol. 9, No. 5, (1995), pp. 366–374.

*Primary Examiner*—Clifford C. Shaw
*Attorney, Agent, or Firm*—Oblon, Spivak, McClelland, Maier & Neustadt, P.C.

[57] ABSTRACT

An inert gas electric arc welding process is described in which the refractory electrode of the welding torch is rotated about its own axis throughout the welding operation so that the electric arc produced at the end of the electrode rotates and agitates the surface of the melt pool locally and continuously.

5 Claims, 1 Drawing Sheet

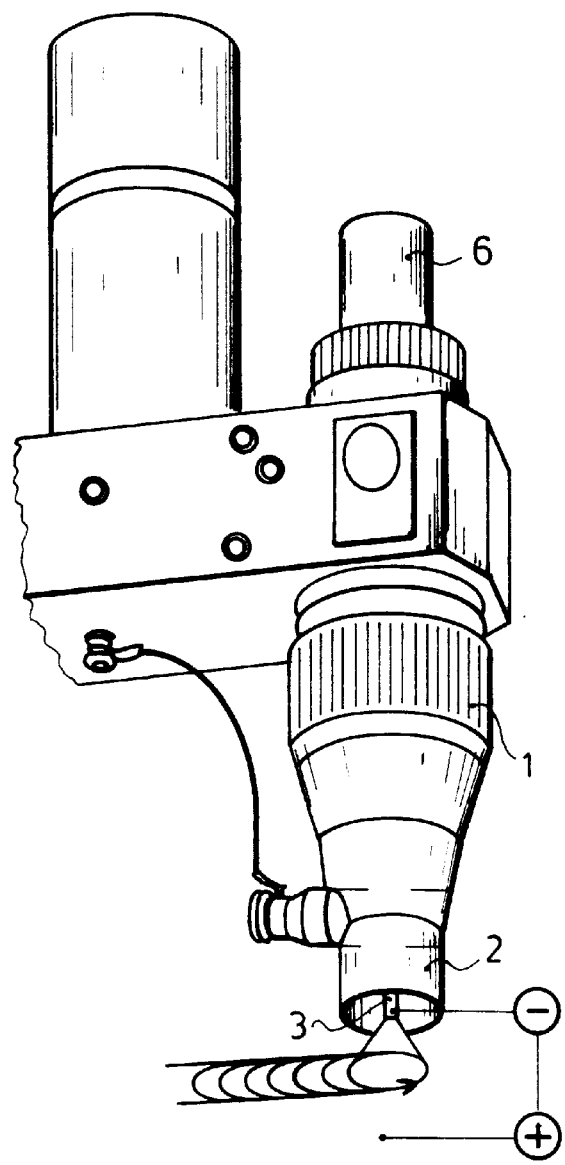
FIG: 1
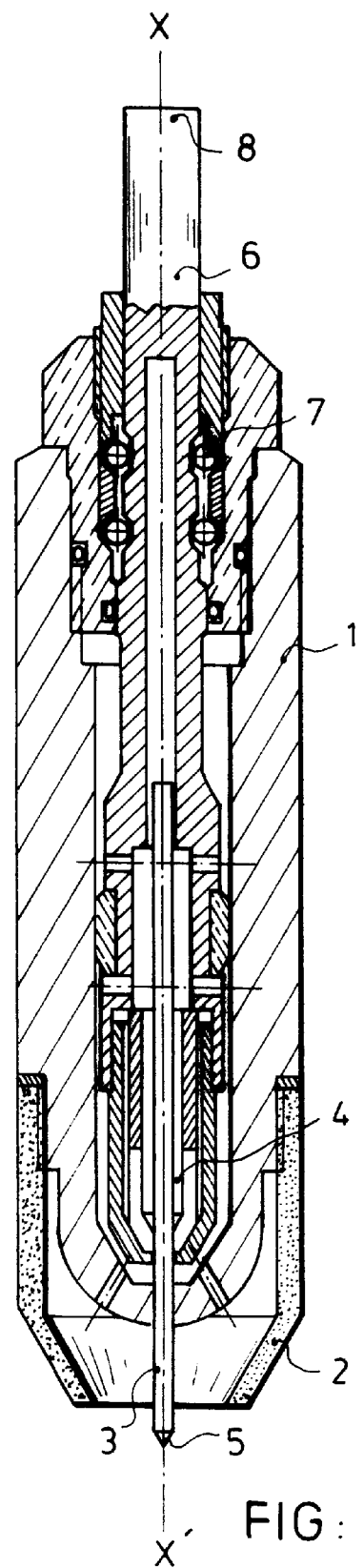
FIG: 2

INERT GAS ELECTRIC ARC WELDING PROCESS AND TORCH FOR USE THEREIN

BACKGROUND OF THE INVENTION

1. Field of the Invention

The invention relates to an inert gas electric arc welding process and to a torch for use in the process.

2. Discussion of the Background

Electric arc welding is carried out in most industrial fields, especially the aerospace, aeronautical and nuclear industries, and is often performed by an automatic welding system.

In TIG arc welding processes an electric arc is produced between a stationary refractory electrode and two metal articles which are to be welded together, and a melt pool is formed by transfer of energy from the arc into the material of the metal articles. The arc and the melt pool are protected by surrounding them with an inert gas. The welding operation is performed progressively either by moving the articles past the stationary arc or by moving the arc over the articles, which remain stationary. However, because of the movement of the arc relatively to the articles, the melt pool has a temperature spread which may cause weld defects. These defects can be blowholes formed by gases trapped in the weld, or an unsatisfactory surface texture of the weld bead. Blowholes have a particularly adverse effect on the mechanical strength of the weld since they produce porosities which weaken the weld. These weld defects are even worse when the weld is formed between two articles made of different metals or between very thick articles.

SUMMARY OF THE INVENTION

It is an object of the invention to overcome these problems and improve weld quality by providing an electric arc welding process which reduces or eliminates blowholes and facilitates the welding of very thick articles and articles made of different metals.

Accordingly, the invention provides a process for welding two metallic articles together using an inert gas electric arc welding torch comprising a torch body and a refractory electrode disposed in said torch body, wherein an electric arc is produced between said refractory electrode and said two metal articles to be welded, and said arc is moved relatively to said metal articles to progressively weld said articles together, said process including the step of continuously rotating said refractory electrode about its own axis during the welding operation while keeping said torch body stationary relative to said axis.

The electric arc thus rotates with the electrode and acts to agitate the melt pool surface locally and continuously so that a homogeneous temperature is produced at the weld point, whereby the quality and surface texture of the weld are improved. The agitation of the melt pool also helps to remove gases and eliminate blowholes.

The invention also provides an inert gas electric arc welding torch comprising a torch body having a longitudinal axis, a refractory electrode disposed in the torch body on the longitudinal axis for producing an electric arc between two metal articles Lo be welded together, a shaft secured to said refractory electrode and disposed longitudinally in said torch body coaxially with said longitudinal axis, and means mounting said shaft for rotation about said longitudinal axis within said torch body whereby said shaft is adapted to rotate said refractory electrode about said longitudinal axis while said torch body remains stationary relative to said axis.

Preferred features and advantages of the invention will become apparent from the following description of the preferred embodiment, given by way of non-limitative example, with reference to the accompanying drawings.

BRIEF DESCRIPTION OF THE DRAWINGS

FIG. 1 shows a perspective view of one embodiment of an electric arc welding torch in accordance with the invention during operation; and FIG. 2 shows a longitudinal sectional view of the internal structure of the welding torch.

DESCRIPTION OF THE PREFERRED EMBODIMENT

The drawings show a welding torch for inert gas welding with a tungsten electrode, called TIG welding, the torch comprising a cylindrical torch body 1 having a longitudinal axis XX' and, at one end near the welding plane, an inert gas discharge nozzle 2. A refractory electrode 3 is disposed in the torch body on the longitudinal axis XX' and is held in position by means of a clamp 4. The electrode 3 has a tip 5 for producing an electric arc which creates a melt pool between two metal articles to be welded.

The electrode 3 is rigidly connected to a shaft 6 for rotating the electrode about its axis, i.e. the longitudinal axis XX', the shaft being disposed longitudinally in the torch body 1 and mounted for rotation about the axis XX' by bearings 7. One end 8 of the shaft 6 extends beyond the torch body 1 and is adapted to be connected to drive means (not shown) for rotating the shaft.

On commencement of a welding operation, the shaft 6 is rotated about the axis XX' and thus drives the electrode also to rotate about said axis, the torch body 1 remaining stationary relative to the axis.

The electrode is rotated throughout the welding operation, and the standing electric arc produced at the end of the rotating electrode thus rotates on itself and agitates the surface of the resulting melt pool locally and continuously. The melt pool surface is therefore in a state of vibration which boosts the capillarity of the pool, improves the homogeneity of the melt zone and accelerates degassing of the pool. The surface texture of the resulting weld bead is even and the junctions between the melt zone and the metal of the welded articles are progressive.

The invention is, of course, not limited to the particular embodiment described. For example, a torch and electrode assembly which rotates axially can be used, although this causes problems with electrical connections between the torch and the welding installations to which the torch is connected, as well as problems with supplying the torch with inert gas and cooling fluid.

We claim:

1. A process for welding two metallic articles together using an inert gas electric arc welding torch comprising a torch body having a longitudinal axis and a solid refractory electrode disposed in said torch body and having a single point isolated on the axis, wherein an electric arc is produced between said refractory electrode and said two metal articles to be welded, which comprises;

moving said arc relative to said metal articles to progressively weld said articles together; and continuously rotating said refractory electrode having said single point about the axis of said torch body during the welding operation while keeping said torch body stationary relative to said axis so as to create an electric arc which spins about itself.

2. An inert gas electric arc welding torch, comprising a torch body having a longitudinal axis, a refractory electrode having a single point located on the axis and disposed in said torch body on said longitudinal axis for producing an electric arc between two metallic articles to be welded together, a shaft secured to said refractory electrode and disposed longitudinally in said torch body coaxially with said longitudinal axis, and means mounting said shaft for rotation about said longitudinal axis within said torch body such that said refractory electrode is rotatable by said shaft, said refractory electrode having said single point about said longitudinal axis while said torch body remains stationary relative to said axis so as to create an electric arc which spins about itself.

3. A welding torch according to claim 2, wherein said shaft has one end extending outside said torch body, and said one end is connectable to drive means for rotating said shaft about said longitudinal axis.

4. An inert gas electric arc welding torch, comprising a torch body having a longitudinal axis, a refractory electrode having a single point located on the axis and disposed in said torch body on said longitudinal axis for producing an electric arc between two metallic articles to be welded together, a shaft secured to said refractory electrode and disposed longitudinally in said torch body coaxially with said longitudinal axis, and a mounting mechanism mounting said shaft for rotation about said longitudinal axis within said torch body such that said refractory electrode is rotatable by said shaft, said refractory electrode having said single point about said longitudinal axis while said torch body remains stationary relative to said axis so as to create an electric arc which spins about itself.

5. A welding torch according to claim 4, wherein said shaft has one end extending outside said torch body, and said one end is connectable to a drive mechanism rotating said shaft about said longitudinal axis.

* * * * *